United States Patent
Logue et al.

(10) Patent No.: US 12,448,824 B2
(45) Date of Patent: Oct. 21, 2025

(54) PANEL ASSEMBLY FOR A VEHICLE

(71) Applicant: The Boeing Company, Chicago, IL (US)

(72) Inventors: Adam Arthur Logue, Everett, WA (US); Jeffrey Allen Cartwright, Arlington, WA (US); Steven Ellis Rhynard, Mukilteo, WA (US); Joe Files, Arlington, WA (US)

(73) Assignee: THE BOEING COMPANY, Arlington, VA (US)

( * ) Notice: Subject to any disclaimer, the term of this patent is extended or adjusted under 35 U.S.C. 154(b) by 876 days.

(21) Appl. No.: 17/527,633

(22) Filed: Nov. 16, 2021

(65) Prior Publication Data

US 2023/0150644 A1    May 18, 2023

(51) Int. Cl.
| | |
|---|---|
| *B64C 1/06* | (2006.01) |
| *E05B 57/00* | (2006.01) |
| *E05B 65/00* | (2006.01) |
| *E05C 3/12* | (2006.01) |

(52) U.S. Cl.
CPC ............ *E05C 3/12* (2013.01); *E05B 57/00* (2013.01); *E05B 65/006* (2013.01)

(58) Field of Classification Search
CPC .......... E05B 57/00; E05B 65/006; E05C 3/12; B64C 1/066
See application file for complete search history.

(56) References Cited

U.S. PATENT DOCUMENTS

| | | | |
|---|---|---|---|
| 3,603,636 A | 9/1971 | Carella et al. | |
| 4,995,649 A * | 2/1991 | Magnusson | E05B 65/0835 |
| | | | 292/341.17 |
| 5,441,218 A | 8/1995 | Mueller et al. | |
| 5,456,529 A | 10/1995 | Cheung | |
| 6,290,175 B1 | 9/2001 | Hart et al. | |
| 7,802,826 B2 | 9/2010 | Schmitz et al. | |
| 8,665,119 B2 * | 3/2014 | Hashberger | E05C 3/24 |
| | | | 361/837 |
| 8,876,050 B2 | 11/2014 | Wentland et al. | |
| 9,745,064 B2 | 8/2017 | Balasubramanian | |

(Continued)

FOREIGN PATENT DOCUMENTS

WO    2017178078 A1    10/2017

*Primary Examiner* — Kristina R Fulton
*Assistant Examiner* — Thomas L Neubauer
(74) *Attorney, Agent, or Firm* — COATS & BENNETT, PLLC

(57) ABSTRACT

A panel assembly for an overhead support structure of a vehicle. The panel assembly includes a panel movable relative to the overhead support structure between a stowed position and an open position. One or more actuators release the panel from the stowed position. The actuators include first and second bodies arranged together and configured to move relative to each other and with the first body movable relative to the overhead support structure between first and second positions. The first position orients the second body at a first angular position relative to the overhead support structure that engages a catch on the second body with a latch pin. The second position orients the second body at a different second angular position relative to the overhead support structure to release the catch from the latch pin and thereby release the panel from the stowed position.

20 Claims, 10 Drawing Sheets

(56) References Cited

U.S. PATENT DOCUMENTS

| | | |
|---|---|---|
| 2003/0141414 A1 | 7/2003 | Itakura et al. |
| 2005/0029832 A1 | 2/2005 | Verduci et al. |
| 2007/0064964 A1 | 3/2007 | Cheung |
| 2008/0078871 A1 | 4/2008 | Munson et al. |
| 2009/0243329 A1 | 10/2009 | Hustyi et al. |
| 2013/0290221 A1 | 10/2013 | Jindel |
| 2017/0058561 A1 | 3/2017 | Terry et al. |
| 2017/0283060 A1 | 10/2017 | Papke et al. |
| 2018/0179786 A1 | 6/2018 | Johnson |
| 2020/0269983 A1 | 8/2020 | Berkenhoff et al. |
| 2020/0339276 A1 | 10/2020 | Chengalva |
| 2021/0229794 A1 | 7/2021 | Vayssiere et al. |

\* cited by examiner

PANEL ASSEMBLY FOR A VEHICLE

TECHNOLOGICAL FIELD

The present disclosure relates generally to the field of panel assemblies and, more specifically, to panel assemblies with one or more actuators to release the panels from a stowed position.

BACKGROUND

Vehicles such as aircraft include panels that are connected to support structures at walls and ceilings within an interior space. The panels function to cover various components, such as but not limited to electrical components, electrical wiring, HVAC equipment, personal service unit equipment (e.g., emergency air system, lighting fixtures), and computer software equipment. In addition, the panels can also provide for an aesthetically pleasing appearance when positioned in the cabin area of the vehicle or other location where passengers are located.

The components that are covered by the panels may require periodic service. For example, various work is performed on the electrical components during maintenance work on the vehicle. This requires the panels to be disconnected from the support structure to allow for a technician to access the components. The panels should be mounted in a manner in which the technician can disconnect the panels in a straight-forward manner. Likewise, when the work on the components is completed, the panels should be configured to be re-connected to the support structure and repositioned to extend over the components.

SUMMARY

One aspect is directed to a panel assembly for an overhead support structure of a vehicle. The panel assembly comprises a panel movable relative to the overhead support structure between a stowed position and an open position. One or more actuators are configured to release the panel from the stowed position. Each of the actuators comprises a first body and a second body arranged together and configured to move relative to each other and with the first body movable relative to the overhead support structure between first and second positions. The first position of the first body orients the second body at a first angular position relative to the overhead support structure that engages a catch on the second body with a latch pin. The second position of the first body orients the second body at a different second angular position relative to the overhead support structure to release the catch from the latch pin and thereby release the panel from the stowed position.

In another aspect, the first body comprises a contact section and the second body comprises a cam surface with the first position locating the contact section at a first point on the cam surface to orient the second body at the first angular position and with the second position locating the contact section at a second point along the cam surface to orient the second body at the second angular position.

In another aspect, the cam surface comprises a ramp that is aligned transverse to a longitudinal centerline of the first body when the first body is in both the first and second positions.

In another aspect, the second body is axially aligned with the first body when the first body is in the first position.

In another aspect, the panel comprises a perimeter edge that extends between an inward face and an outward face with the actuator comprising a first end that is aligned at the perimeter edge to visually hide the actuator from an interior space of the vehicle when the panel is in the stowed position.

In another aspect, the second body is movable about a pivot between the first and second angular positions.

In another aspect, the one or more actuators are configured to be mounted to the overhead support structure and the latch pin is configured to be mounted to the panel.

In another aspect, a personal service unit is mounted to the panel and spaced away from the one or more actuators.

In another aspect, a biasing member applies a force to the first body to bias the first body towards the first position.

One aspect is directed to a panel assembly for an overhead support structure of a vehicle. The panel assembly comprises a panel movable relative to the overhead support structure between a stowed position and an open position. One or more actuators are configured to release the panel from the stowed position. The actuators comprise a first body with an elongated shape with a first end and a second end and movable along a first axis between a first position and a second position. A second body comprises a contact surface and a catch with the catch being spaced away from the contact surface and configured to engage with a latch pin. The second body is movable between a first angular position at a first angle relative to the first axis and a second angular position at a second angle relative to the first axis. In the first position, the first body is in contact at a first point on the contact surface to position the second body at the first angular position with the catch engaged with the latch pin to maintain the panel in the stowed position. In the second position, the first body is in contact at a second point on the contact surface to position the second body at the second angular position to release the catch from the latch pin and release the panel from the stowed position.

In another aspect, the contact surface comprises a ramped surface that is aligned at an acute angle relative to a longitudinal axis of the first body and the second end of the first body contacts against a first point on the ramped surface in the first position and against a second point on the ramped surface in the second position.

In another aspect, the second body comprises a pivot about which the second body pivots between the first and second angular positions.

In another aspect, the first body comprises a longitudinal axis that is aligned parallel to an inward face of the panel when the panel is in the stowed position.

In another aspect, an amount of overlap between the first body and the second body is greater with the first body in the second position than in the first position.

One aspect is directed to a method of releasing a panel from an overhead support structure of a vehicle. The method comprises: contacting a first body against a ramped surface of a second body and positioning the second body at a first angular position with a catch on the second body engaged with a latch pin to maintain the panel in a stowed position; moving the first body away from a perimeter edge of the panel and moving the first body along the ramped surface of the second body; and pivoting the second body in response to the first body moving along the ramped surface and releasing the catch from the latch pin thereby releasing the panel from the stowed position.

In another aspect moving the first body away from the perimeter edge of the panel comprises linearly moving the first body along an axis that is aligned perpendicular to the perimeter edge of the panel.

In another aspect, the method further comprises aligning a first end of the first body at a perimeter edge of the panel and hiding the first body from being visible from within an interior of the vehicle.

In another aspect, the method further comprises contacting the first body against the ramped surface and preventing the catch from releasing from the latch pin.

In another aspect, the method further comprises biasing the second body to remain engaged with the latch pin.

In another aspect, the method further comprises attaching the first body and the second body to the overhead support structure.

The features, functions and advantages that have been discussed can be achieved independently in various aspects or may be combined in yet other aspects, further details of which can be seen with reference to the following description and the drawings.

DETAILED DESCRIPTION

Figure 1:
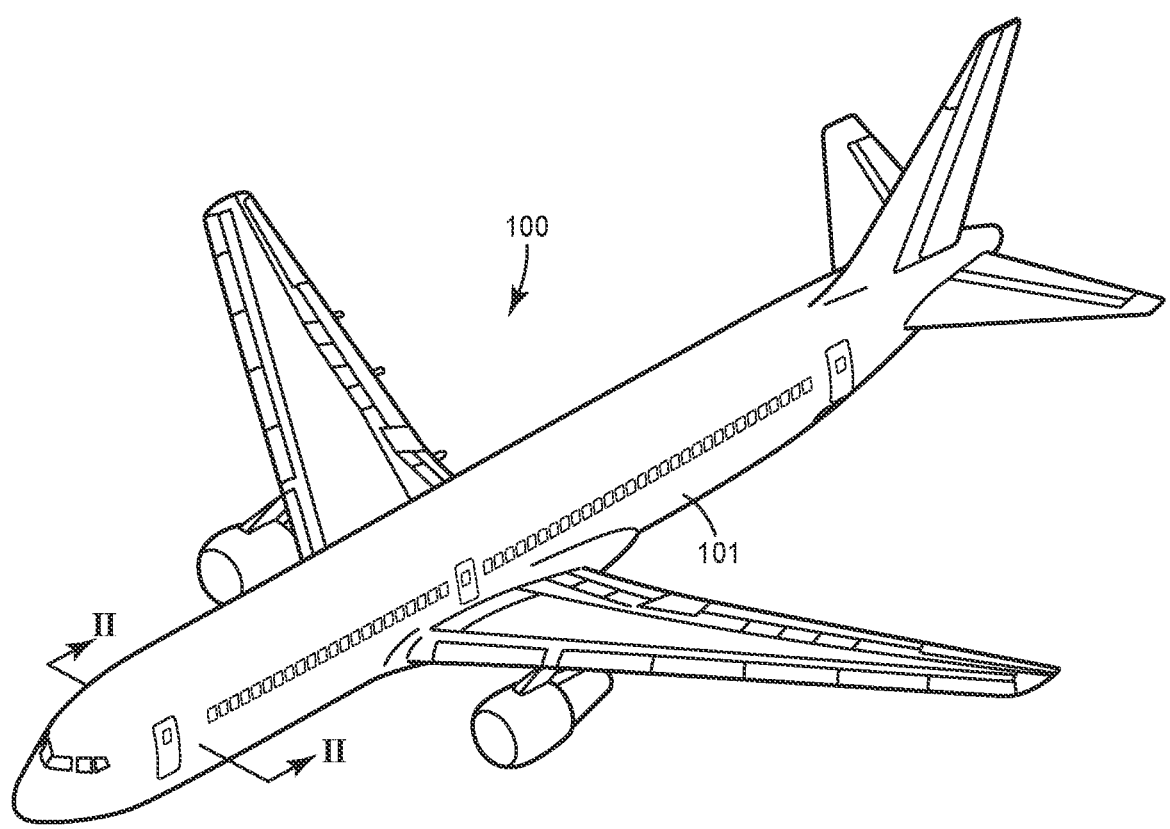
FIG. 1 is a perspective view of an aircraft.
Figure 2:
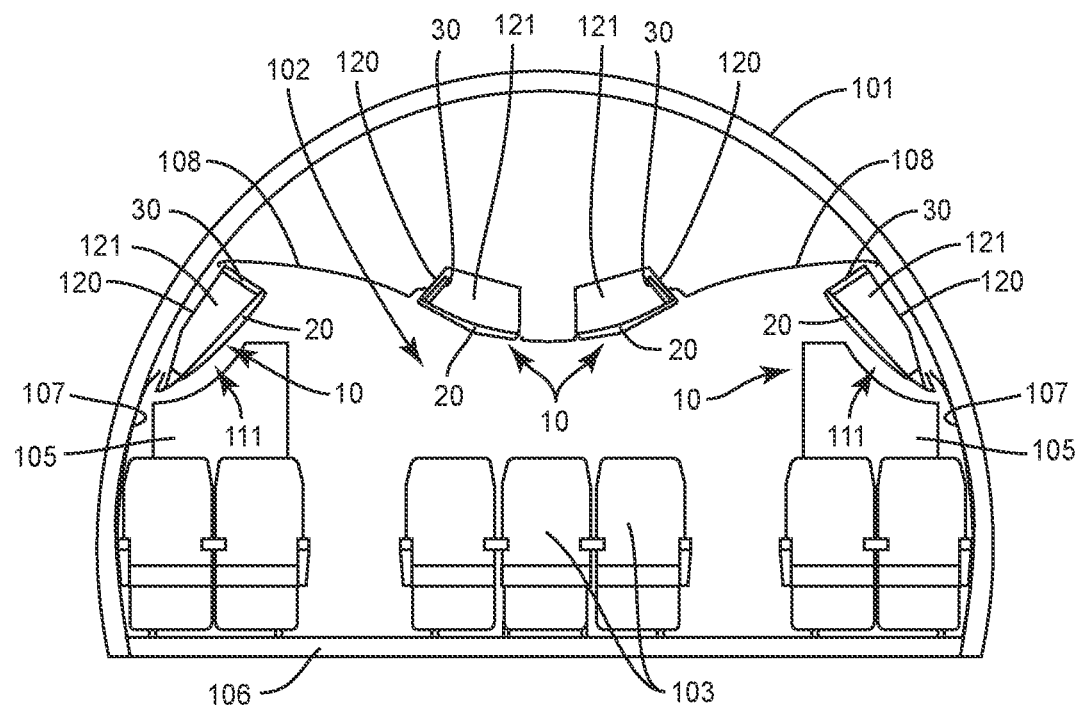
FIG. 2 is a schematic section view cut along line II-II of FIG. 1 of an interior space of the aircraft.

The panel assembly 10 can be used with a variety of different vehicles 100. One type of vehicle 100 is an aircraft 100 as illustrated in FIG. 1. The aircraft 100 includes a fuselage 101 configured to accommodate passengers and/or cargo. FIG. 2 is a partial cross-sectional, schematic view of an upper section of the fuselage 101 that includes an interior space 102 configured to accommodate the passengers. The interior space 102 includes seats 103 and various other components for the passengers.

Monument walls 105 are fixedly mounted in the interior space 102. The monument walls 105 can include various structures, including but not limited to walls that separate different sections of the aircraft 100 or define a passenger space, storage closet for passenger cargo and clothing (e.g., jackets, briefcase), equipment closet, lavatory, galley, attendant workstation, and a serving area. The monument walls 105 are attached to the structure of the aircraft 100, such as to one or more of the floor 106, walls 107, and ceiling 108. The attachment prevents the monument walls 105 from moving within the interior space 102.

One or more access spaces 121 are positioned at the interior space 102, such as in areas above the interior space 102 as illustrated in FIG. 2. The access spaces 121 are sized for functional components of the aircraft 100, including but not limited to various electrical components and wiring, ventilation system components, and personal service unit elements such as speakers, and emergency air components. An overhead support structure 120 supports the functional components. The access space area 121 is divided into sections that are accessed through panels 20. The panels 20 are part of a panel assembly 10 that is configured to provide access to the access spaces 121. The panel assembly 10 is configured to be secured to the overhead support structure 120 to prevent a passenger from accessing the access space 121. The panel assembly 10 is further configured for the panel 20 to be removed from the overhead support structure 120 to provide access to the access space 121, such as for a technician working on the aircraft 100.

Figure 3:
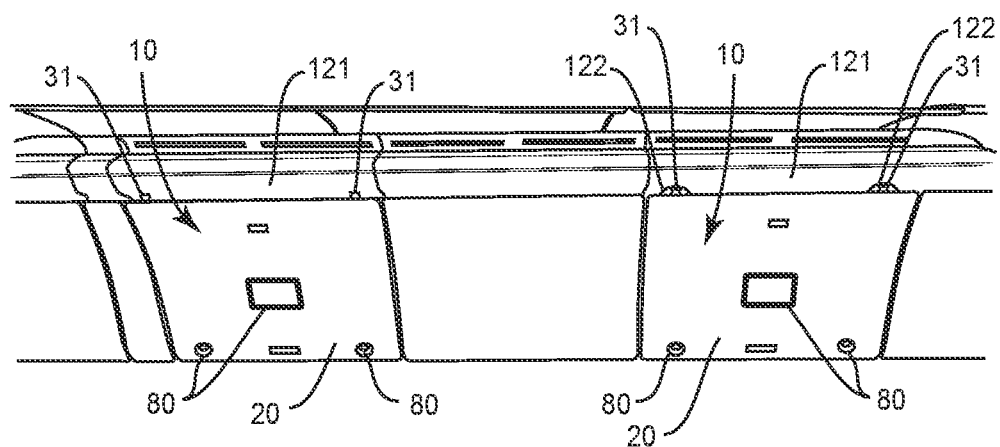
FIG. 3 is a side view of panels in a stowed position against a support structure.

In addition to functionally extending in front of the functional components in the access space 121, the panels 20 provide aesthetic features of the interior space 102. As illustrated in FIG. 3, the panels 20 are configured to match the overall appearance of the other features of the interior space 102.

In one example, the panel assemblies 10 extend over one or more monument walls 105 as illustrated in FIG. 2. The monument walls 105 can be in close proximity to the panels 20 with a clearance space 111 formed between the top of the monument walls 105 and the panels 20. The panel assemblies 10 are configured to be connected and disconnected from the overhead support structure 120 while remaining in the limited clearance space 111.

The panel assemblies 10 can be located at various locations within the aircraft 100. As illustrated in FIG. 2, panel assemblies 10 can be mounted at the outboard sides of the interior space, as well as one or more central locations within the interior space 102.

Figure 4:
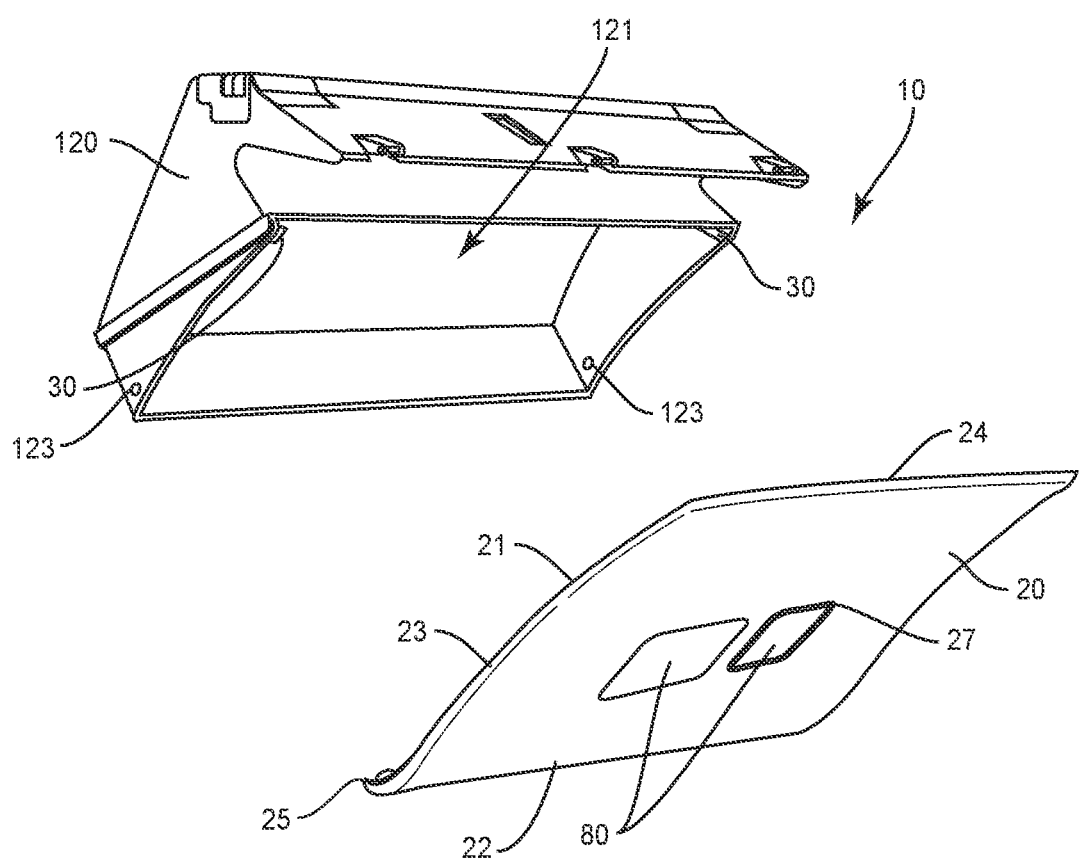
FIG. 4 is an exploded perspective view of a panel and a support structure.

FIG. 4 illustrates an exploded view of a panel 20 configured to be mounted over an access space 121 formed within a support structure 120. One or more actuators 30 releasably connect the panel 20 to the support structure 120. The panel 20 can be further connected to the support structure at one or more pivot joints 123. The pivot joints 123 maintain the panel 20 connected to the support structure 120 when the actuators 30 are released.

In one example, the actuators 30 selectively connect a top section of the panel 20 to the support structure 120. When the one or more actuators 30 are engaged, the panel 20 is in a stowed position that extends across the access space 121 (see FIG. 3). When the one or more actuators 30 are released, the panel 20 is in an open position with the upper section pivoted away from the support structure 120.

The panel 20 functions to extend across and cover the access space 121 in the stowed position. The panel 20 has a plate-like shape with an inward face 21 that faces into the access space 121 in the stowed position and an outward face 22 that faces outward into the interior space 102 of the vehicle 100. A perimeter edge 23 extends around the panel 20 and spans between the inward and outward faces 21, 22. The perimeter edge 23 includes opposing first and second edges 24, 25. In one example, the first edge 24 is an inboard edge that is positioned towards a center of the vehicle 100 when mounted to the overhead support structure 120 and an opposing outboard edge 25.

In one example, one or more passenger support units (PSU) 80 are attached to the panel 20. Examples of a PSU 80 include but are not limited to speakers, lights (e.g., no smoking light, reading light), components of an emergency oxygen system such as mask, conduit, and air tank/pump, and components of the environmental control system for air ventilation including plenums, conduits, nozzles, and a valve adjustment mounted on the exterior for passenger control. FIG. 3 illustrates a panel 20 that include multiple PSU 80. A first PSU 80 is mounted towards a center of the panel 20 and is equipped for larger equipment, such as emergency oxygen canister and mask or a speaker for the public announcement (PA) system. Smaller PSU 80, such as emergency lights are mounted towards the perimeter of the panel 20. In one example, the PSU 80 are positioned in openings 27 within the panel 20. This provides for a portion of the PSU 80 to be accessible to the passenger and/or positioned to be utilized as needed.

One or more actuators 30 secure the panel 20 in the stowed position. The actuators 30 are configured to engage with latch pins 29. In one example, the actuators 30 are mounted to the panel 20 and the latch pins 29 are mounted to the support structure 120. Another example includes the opposing arrangement with the actuators 30 mounted to the support structure 120 and the latch pins 29 mounted to the panels 20. When the actuators 30 are engaged with the latch pins 29, the panel 20 is in the stowed position. When the actuators 30 are released, the panel 20 pivots outward to provide access to the access space 121. The number and positioning of the actuators 30 and latch pins 29 can vary. In one example, a pair of actuators 30 are mounted to the support structure 120 on opposing sides of an access space 121 and configured to engage latch pins 29 positioned on opposing lateral sides of a panel 20. In another example, a single actuator 30 is mounted to one of the support structure 120 or panel 20 and engages with an opposing latch pin 29. In another example, three or more actuators 30 are mounted to engage with corresponding latch pins 29.

The actuator 30 can be constructed from one or more sections. In examples with multiple sections, one or more of the sections can be fixed relative to one another or can be movable relative to one another. The actuators 30 include an elongated shape with a first end 31 positioned in proximity to the perimeter edge 23 of the panel 20. In one example, the first end 31 is aligned with the perimeter edge 23. In another example, the first end 31 is spaced inward towards a central region of the panel 20. The actuators 30 are positioned for the first end 31 to be accessible to a technician in the interior space 102 that is moving the panel 20 to the open position. The first end 31 is also positioned to be visually hidden from the interior space 102. This prevent a passenger who is not authorized to open the panel 20 from seeing and manipulating the actuator 30. This hidden positioning also prevents the first end 31 from potentially lessening the aesthetic appearance of the interior space 102.

In one example as illustrated in FIG. 2, the actuators 30 are visibly hidden from a passenger that is seated in one of the seats 103. In another example, the actuators 30 visibly hidden from a passenger that is standing at their seat 103 in the interior space 102. The viewing angle for the passengers seated and standing is below a first end 31 of the actuator 30 and thus hidden from view. For a technician working on the panel assembly 10, the first end 31 of the actuator 30 may be visible if the technician were standing on a ladder. FIG. 3 illustrates an example of a view for a technician standing on a ladder and having an elevated view to the actuators 30 and thus providing for the first ends 31 to be visible.

In one example as illustrated in FIG. 3, coves 122 are formed into the support structure 120 at the perimeter edge 23 of the panel 20. The coves 122 are spaces that provide for a technician to fit their hand and/or fingers to access the first end 31.

Figure 5:
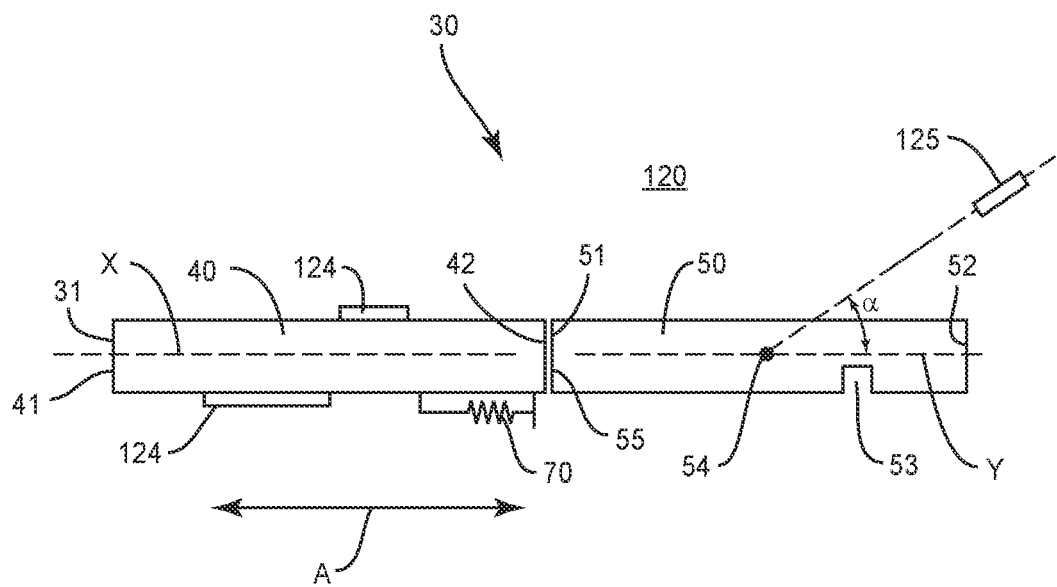
FIG. 5 is a schematic side view of an actuator that includes first and second bodies.

FIG. 5 schematically illustrates an actuator 30 that includes first and second bodies 40, 50. The first body 40 includes an elongated shape with opposing first and second ends 41, 42. The first end 41 of the first body 40 also forms the first end 31 of the actuator 30. The second body 50 is aligned with the first body 40 and includes a first end 51 and a second end 52.

The first and second bodies 40, 50 are configured to move relative to the support structure 120 to which they are attached. The first and second bodies 40, 50 are also configured to move relative to each other. In the example of FIG. 5, the first body 40 is configured to move linearly along a central axis X of the first body 40 in the directions indicated by arrow A. This movement can occur when a force is applied to the first end 41 by a technician. The first body 40 is mounted to one or more rails 124 on the support structure 120 to control the movement. In one example, the first body 40 is aligned with the axis X parallel to the panel 20 when the panel 20 is in the stowed position. A biasing member 70 can act on the first body 40 and bias the first body 40 in one direction. In one example, the biasing member 70 applies a force to maintain the first body 40 in a first stowed position.

The second body 50 includes a central axis Y that extends between the first and second ends 51, 52. In one example as illustrated in FIG. 5, the two axes X, Y are co-axial in the first stowed position. In another example, the axes X, Y are not aligned. A catch 53 is sized and shaped to engage with a latch pin 29 (not illustrated in FIG. 5). In one example, the catch 53 is formed as a cavity that extends into one side of the second body 50. When the second body 50 moves to the second open position, the axis Y is transverse to the axis X.

The second body 50 is configured to move within an angular range a. In one example, the movement occurs about a pivot 54. The movement of the second body within the angular range a is caused by the linear movement of the first body 40. Movement of the first body 40 causes the first body 40 to apply a force to move the second body 50 within the angular range. In one example, a stop 125 is mounted to the support structure 120 and controls an extent of angular movement. In one example, the first body 40 remains abutted against the second body 40 in both the stowed and open positions. In another example, the first body 40 is spaced away from the second body 40 in the stowed position when no force is applied to the first body 40 by the technician. In this example, the force applied to the first end 41 moves the first body 40 into contact with the second body 50.

Figure 6:
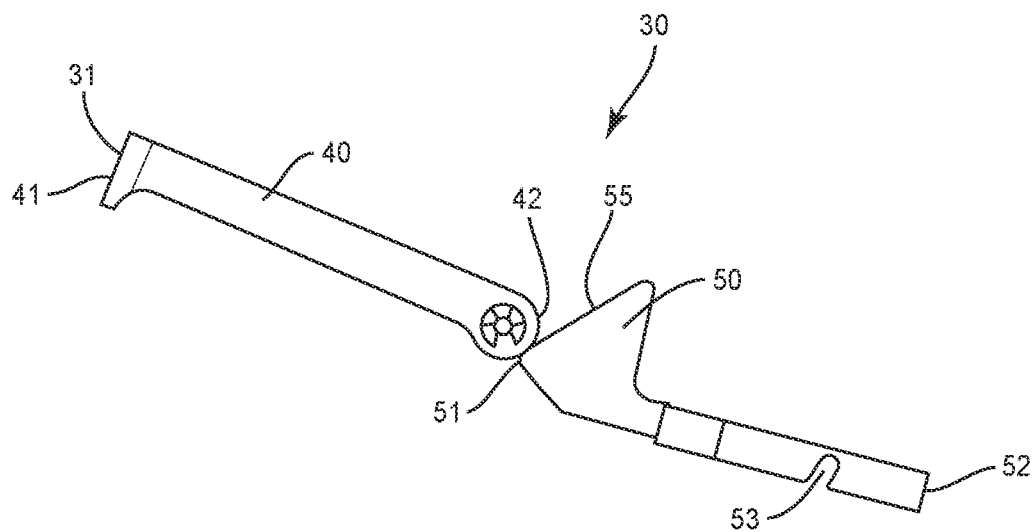
FIG. 6 is a schematic side view of an actuator that includes first and second bodies.

FIG. 6 illustrates an example of an actuator 30 that is formed by the first and second bodies 40, 50. In this example, the actuator 30 is in a stowed position. The second end 42 of the first body 40 is in contact with a surface 55 at the first end 51 of the second body 50. In one example as illustrated by FIG. 6, the first end 51 remains in contact with the second body 50 and overlaps the second body. When a force is applied to the first body 40, the second end 42 moves along the surface 55 of the ramp. This causes the second body 50 to move within the angular range and lift the catch 53 away from the latch pin 29 and release the panel 20. In the release position, the first body 40 overlaps with the second body 50 a greater amount than in the closed position. In one example as illustrated in FIG. 6, the ramp is aligned with the surface 55 transverse to the axis X of the first body 40 when the actuator 30 is in the first stowed position. In one example, the surface 55 is aligned at an acute angle with the axis X of the first body 40 when the actuator 30 is in the first stowed position.

In one example, the first and second bodies 40, 50 act as a cam with the linear motion of the first body 40 causing pivoting motion of the second body 50. The surface 55 is a cam surface with the second end 42 of the first body 40 sliding along the surface 55 to transform the linear motion of the first body to the pivoting motion of the second body 50.

Figure 7A:
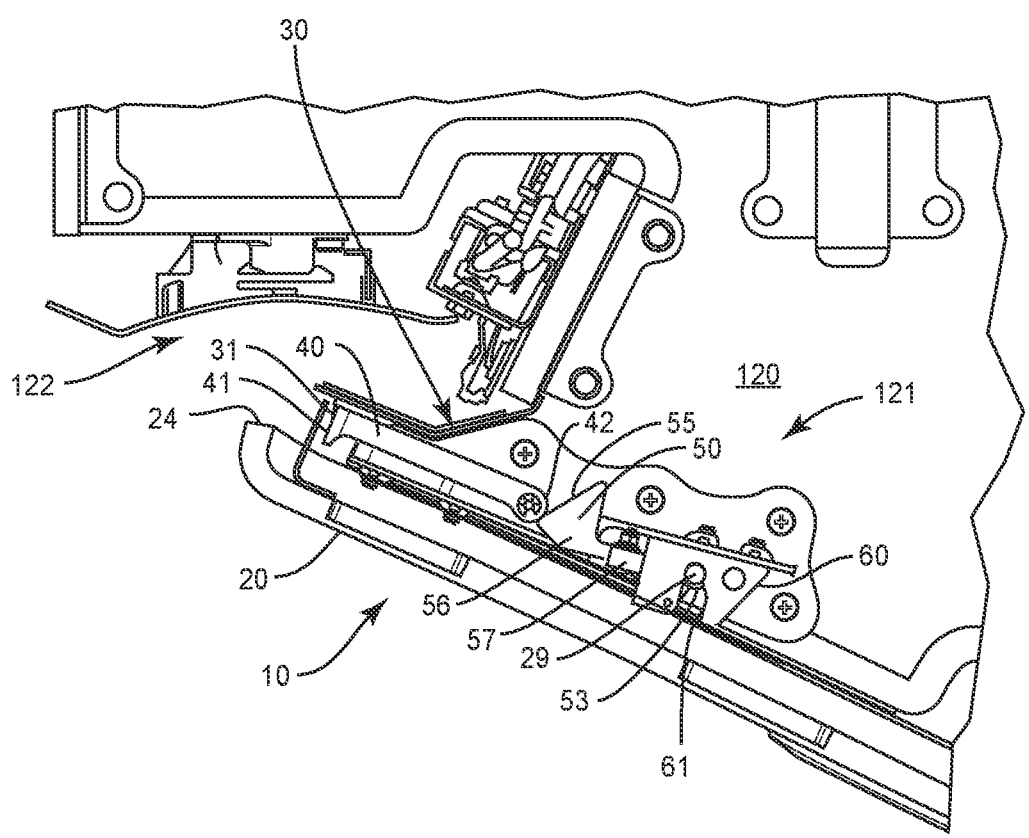
FIG. 7A is a side view of a panel assembly with an actuator engaged with a latch pin and a panel in a stowed position against a support structure.

FIG. 7A illustrates the actuator 30 engaged with the latch pin 29. This positions the panel 20 in the stowed position against or in proximity to the support structure 120 to prevent access to the access space 121. The first end 41 of the first body 40 (and the corresponding first end 31 of the actuator 30) is recessed behind the first edge 24 of the panel 20. In one example in which the panel 20 is mounted along a lateral side of the vehicle 100, the first edge 24 is the inboard edge. A cove 122 is formed in the support structure 120 to provide space for a technician to reach and apply a force to the first end 31.

Figure 7B:
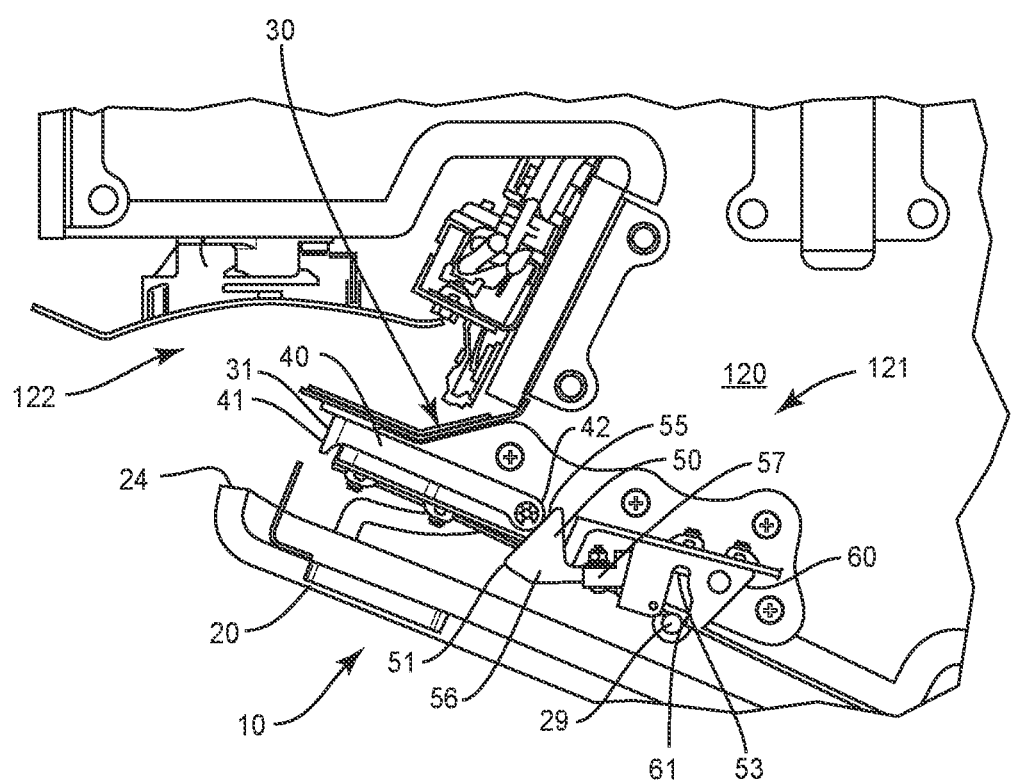
FIG. 7B is a side view of the panel assembly with the actuator released from the latch pin and the panel moved away from the support structure.

As illustrated in FIG. 7A, the first body 40 is in contact at a first point along the surface 55 of the second body 50. This contact positions the second body 50 at an angular position with the catch 53 engaged with the latch pin 29. As illustrated in FIG. 7B, a force applied to the first body 40 moves the first body 40 to a second point along the ramp surface 55. The movement causes the second body 50 to pivot with the first end 51 moving downward and the second end moving upward as illustrated in the orientation of FIG. 7B. This pivoting movement causes the catch 53 to release from the latch pin 29. Once the catch 53 is released, the panel 20 is able to move from the stowed position to an open position to provide access to the access space 121. In one example, the panel 20 is connected to the support structure 120 at one or more pivot joints 123 for the panel 20 to remain attached to the support structure 120 when moving from the stowed position to the open position. In one example, the panel 20 is orientated on the support structure 120 such that gravity causes the panel 20 to fall to the open position once the catch 53 is released from the latch pin 29.

In one example as illustrated in FIGS. 7A and 7B, the second body 50 is formed by a ramp member 56 that includes the ramped surface 55 at the first end 51, and a pawl 57 that includes the catch 53 towards the second end 52. The ramp member 56 and pawl 57 are connected by one or more fasteners. The pawl 57 is further positioned in a housing 60. The housing 60 includes a slot 61 that is open to receive the latch pin 29. The slot 61 aligns with the catch 53 in the pawl 57.

Figure 8:
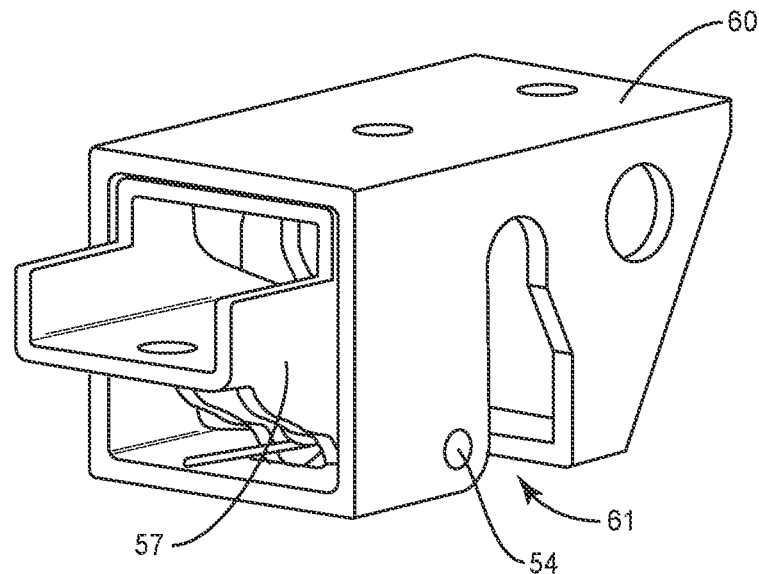
FIG. 8 is a perspective view of a pawl mounted to a housing of a second body of an actuator.
Figure 9:
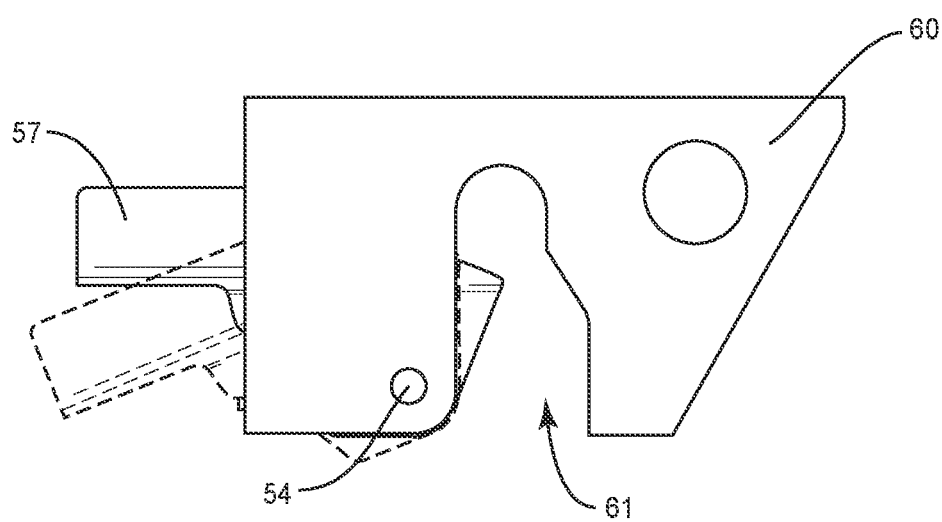
FIG. 9 is a side view of the pawl and housing of FIG. 8 with a first pivotal position of the pawl illustrated in solid lines and a second pivotal position illustrated in dashed lines.

FIGS. 8 and 9 illustrate an example with the pawl 57 mounted at the pivot 54 to the housing 60. This connection provides for the pawl 57 to pivot between the first position to engage the latch pin 29 when the panel 20 is in the stowed position and a release position to disengage from the latch pin 29.

Figure 10:
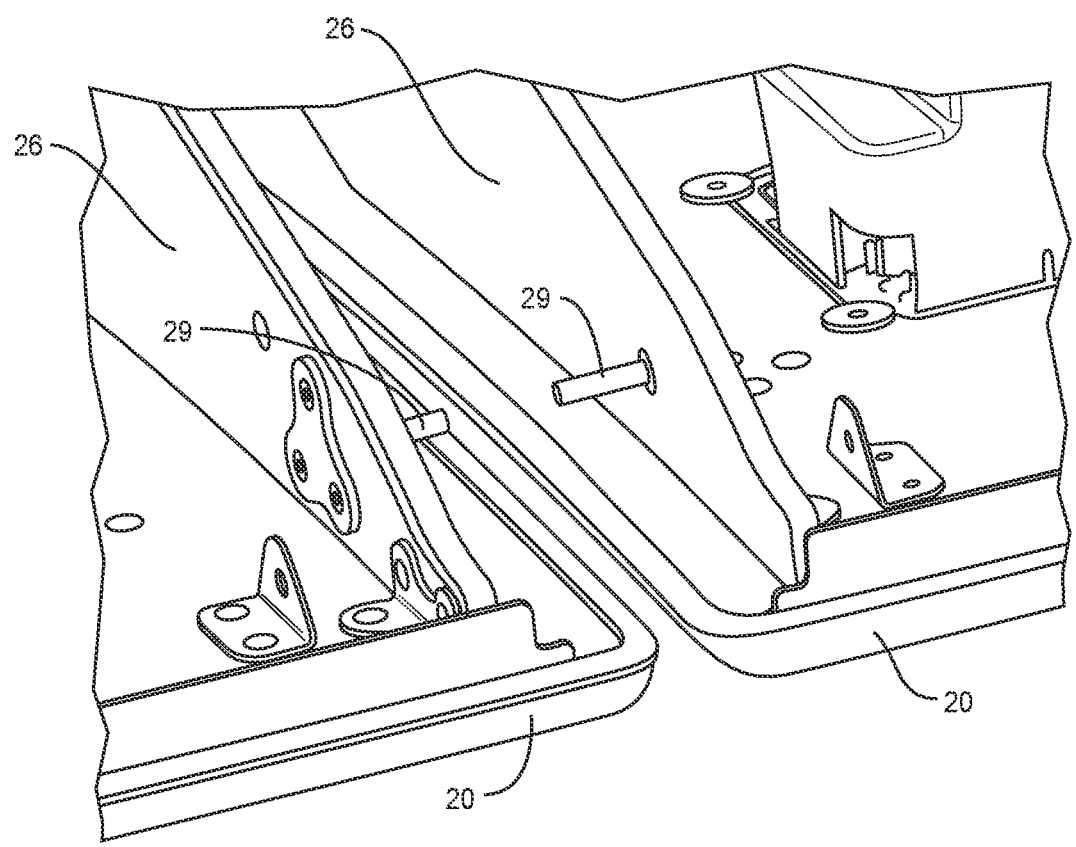
FIG. 10 is a perspective view of latch pins extending from panels.

FIG. 10 illustrates latch pins 29 that are mounted on the panels 20 and position to engage with the actuators 30 that are mounted on the support structure 120. The latch pins 29 are sized to fit into the catch 53 on the actuator 30 and the slot 61 on the housing 60. In another example, the arrangement of the actuators 30 and the latch pin 29 are reversed. The actuators 30 are positioned on the panels 20 and the latch pins 29 are positioned on the support structure 120.

In one example, each panel 20 is secured by a pair of actuators 30. In another example, the panels 20 are secured by a single actuator 30. In yet other examples, the panels 20 are secured by three or more actuators 30.

In one example as illustrated in FIG. 2, the panel 20 is positioned over one or more monument walls 105. A limited clearance space 111 is formed between the panel 20 and the monument wall 105. The panel 20 is connected to the support structure 120 to move within the clearance space 111 between the stowed and open positions. In one example, the extent of pivoting movement of the panel 20 relative to the support structure 120 is substantially within a range of 0-10°. This limited movement maintains the panel 20 spaced away from the monument wall 105 to prevent possible damage to either component.

Figure 11:
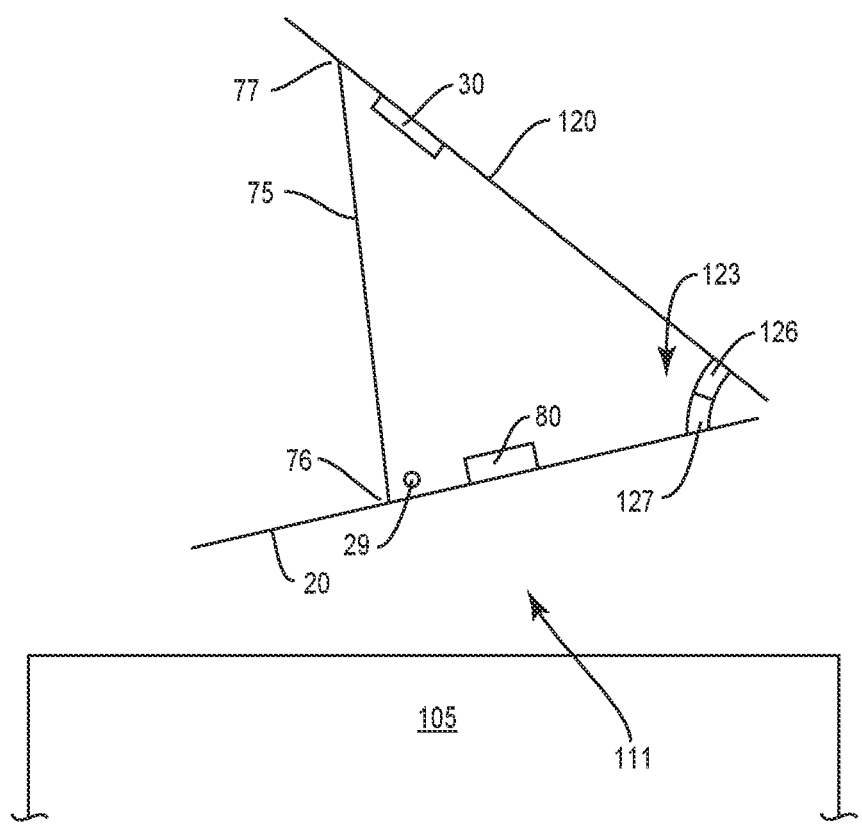
FIG. 11 is a schematic side view of a panel in an open position and attached to a support structure.

In one example as illustrated in FIG. 11, one or more lanyards 75 extend between and connect the panel 20 to the support structure 120. The lanyards 75 include a first end 76 connected to the panel 20 and a second end 77 connected to the support structure 120. The length of the lanyards 75 controls the extent the panels 20 pivot relative to the support structure 120 in the open position. As illustrated in FIG. 11, the lanyards 75 maintain the panel 20 within the clearance space 111 and are positioned away from the monument wall 105 in the open position.

The lanyards 75 also prevent the panel 20 from fully disconnecting from the support structure 120 once the one or more actuators 30 are released. One or both of the first and second ends 76, 77 can be removable to detach from the panel 20 and/or support structure 120 to fully remove the panel 20. In one example, the panel 20 is connected to the support structure 120 at one or more pivot joints 123. The pivot joints 123 provide for the panel 20 to pivot between the stowed and open positions. The pivot joints 123 are also configured for the panel 20 to be removed from the support structure 120. In one example as illustrated in FIG. 11, the pivot joint 123 includes a first member 126 attached to the support structure 120 and a second member 127 attached to the panel 20. The first and second members 126, 127 engage together to allow for the pivoting movement. The first and second members 126, 127 can also be detached from each other to allow for the panel 20 to be removed from the support structure 120. In one specific example, one of the first and second members 126, 127 includes a receptacle and the other member 126, 127 includes an extension that fits into the receptacle when the panel 20 is attached to the support structure 120.

In one example, the lanyards 75 also protect wiring of the PSU 80 that are attached to the panel 20. The wires of the PSU 80 include a pig tail connection that is longer than the lanyard 75. When the lanyard 75 is extended, the lanyard 75 carries the weight/force of the panel 20 without putting stress/strain on the wiring and connectors of the PSU 80.

In the open position, a technician is able to access the access space 121. This can include servicing the PSU 80 and/or components of the PSU 80. For example, the technician can access an oxygen system and replace/repair a canister. The lanyards 75 maintain the position of the panel 20 thus freeing the technician to use both hands of their work within the access space 121.

Figure 12:
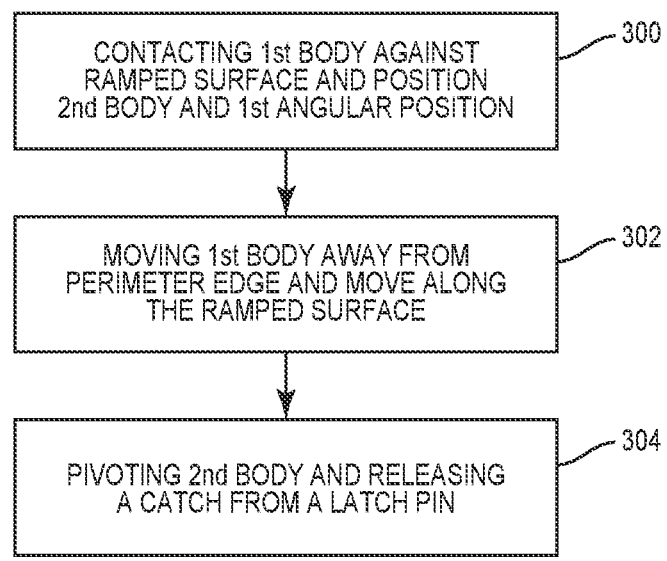
FIG. 12 is a flowchart diagram of a method of releasing a panel from a support structure.

FIG. 12 illustrates a method of releasing a panel 20 from an overhead support structure 120. In the stowed position, the first body 40 contacts against a ramped surface 55 of a second body 50. This positions the second body 50 at a first angular position with a catch 53 on the second body 50 engaged with a latch pin 29 to maintain the panel 20 in a stowed position (block 300). To release the panel 20, the first body 40 is moved away from a perimeter edge 23 of the panel 20 and moves the first body 40 along the ramped surface 55 of the second body 50 (block 302). In response to the first body 40 moving along the ramped surface 55, the second body 50 pivots and releases the catch 53 from the latch pin 29 thereby releasing the panel 20 from the stowed position (block 304).

The assembly 10 can be used on a variety of vehicles 100. Vehicles 100 include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A panel assembly for an overhead support structure of a vehicle, the panel assembly comprising:
    a panel movable relative to the overhead support structure between a stowed position and an open position;
    one or more actuators configured to release the panel from the stowed position, the actuators comprising:
        a first body and a second body each with an elongated shape and comprising an outer end and an inner end;
        the first body and the second body arranged together in an end-to-end configuration with the outer end of the first body spaced away from the outer end of the second body and the inner ends positioned together, the first body and the second body configured to move relative to each other and with the first body movable relative to the overhead support structure between first and second positions;
        the first position of the first body orients the second body at a first angular position relative to the overhead support structure that engages a catch on the second body with a latch pin; and
        the second position of the first body orients the second body at a different second angular position relative to the overhead support structure to release the catch from the latch pin and thereby release the panel from the stowed position;
        the outer ends of the first body and the second body remain spaced apart in both the first position and the second position;
    a housing that extends around the outer end of the second body and that is spaced away from the first body, the housing comprising:
        walls that extend around an open interior that receives the outer end of the second body; and
        a slot that extends into the walls and that aligns with the catch on the second body.

2. The panel assembly of claim 1, wherein the first body comprises a contact section at the inner end and the second body comprises a cam surface at the inner end with the first position locating the contact section at a first point on the cam surface to orient the second body at the first angular position and with the second position locating the contact section at a second point along the cam surface to orient the second body at a second angular position.

3. The panel assembly of claim 2, wherein the cam surface comprises a ramp that is aligned transverse to a longitudinal centerline of the first body when the first body is in both the first and second positions.

4. The panel assembly of claim 1, wherein the second body is axially aligned with the first body when the first body is in the first position.

5. The panel assembly of claim 1, wherein the panel comprises a perimeter edge that extends between an inward face and an outward face, the outer end of the first body is aligned at the perimeter edge to visually hide the actuator from an interior space of the vehicle when the panel is in the stowed position.

6. The panel assembly of claim 1, wherein the second body is mounted to the housing at a pivot and the second body is movable about the pivot between the first and second angular positions.

7. The panel assembly of claim 1, wherein the one or more actuators are configured to be mounted to the overhead support structure and the latch pin is configured to be mounted to the panel.

8. The panel assembly of claim 1, further comprising a personal service unit mounted to the panel and spaced away from the one or more actuators.

9. The panel assembly of claim 1, further comprising a biasing member that applies a force to the first body to bias the first body towards the first position.

10. A panel assembly for an overhead support structure of a vehicle, the panel assembly comprising:
    a panel movable relative to the overhead support structure between a stowed position and an open position;
    one or more actuators configured to be connected to the overhead support structure and configured to release the panel from the stowed position, the actuators comprising:
        a housing comprising walls that extend around an interior space and with a slot that is configured to face away from the overhead support structure;
        a first body positioned away from the housing and comprising an elongated shape with an outer end positioned towards an edge of the panel and an inner end positioned away from the edge of the panel, the first body being movable along a first axis between a first position and a second position;
        a second body positioned on an opposite side of the first body relative to the edge of the panel, the second body comprising a contact surface positioned away from the housing and a catch positioned in the housing with the catch being spaced away from the contact surface and configured to engage with a latch pin, the second body movable between a first angular position at a first angle relative to the first axis and a second angular position at a second angle relative to the first axis, the second body positioned at the housing with the catch aligned with the slot in the housing;

in the first position, the inner end of the first body is in contact at a first point on the contact surface to position the second body at the first angular position with the catch engaged with the latch pin to maintain the panel in the stowed position and with the latch pin positioned in the slot;

in the second position, the inner end of the first body is in contact at a second point on the contact surface to position the second body at the second angular position to release the catch from the latch pin and release the panel from the stowed position;

the first body and the second body aligned with the outer end of the first body spaced away from the catch of the second body; and the inner end of the first body is positioned closer to the catch in the second position than in the first position.

11. The panel assembly of claim 10, wherein the contact surface comprises a ramped surface that is aligned at an acute angle relative to a longitudinal axis of the first body and the inner end of the first body contacts against a first point on the ramped surface in the first position and against a second point on the ramped surface in the second position.

12. The panel assembly of claim 10, wherein the second body comprises a pivot about which the second body moves between the first and second angular positions with the second body connected to the housing at the pivot.

13. The panel assembly of claim 10, wherein the first body comprises a longitudinal axis that is aligned parallel to an inward face of the panel when the panel is in the stowed position.

14. The panel assembly of claim 10, wherein an amount of overlap between the first body and the second body is greater with the first body in the second position than in the first position.

15. A method of releasing a panel from an overhead support structure of a vehicle, the method comprising:

positioning an outer end of a first body in proximity of a perimeter edge of the panel and positioning a second body along a panel inward from the first body and with a portion of the second body that is away from the first body positioned in a housing;

contacting an inner end of the first body against a ramped surface of the second body and positioning the second body at a first angular position with a catch on the second body positioned in the housing and engaged with a latch pin that extends into a slot in the housing to maintain the panel in a stowed position;

moving the first body away from the perimeter edge of the panel and towards the second body and moving the first body along the ramped surface of the second body and maintaining the first body in closer proximity to the perimeter edge of the panel than the second body; and pivoting the second body in response to the first body moving along the ramped surface and moving the second body in the housing and releasing the catch from the latch pin thereby allowing the latch pin to move out of the slot in the housing and releasing the panel from the stowed position.

16. The method of claim 15, wherein moving the first body away from the perimeter edge of the panel comprises linearly moving the first body along an axis that is aligned perpendicular to the perimeter edge of the panel.

17. The method of claim 15, further comprising aligning the outer end of the first body at the perimeter edge of the panel and hiding the first body from being visible from within an interior of the vehicle.

18. The method of claim 15, further comprising contacting just the inner end of the first body against the ramped surface and preventing the catch from releasing from the latch pin.

19. The method of claim 15, further comprising biasing the second body to remain engaged with the latch pin.

20. The method of claim 15, further comprising attaching the first body and the second body to the overhead support structure.

* * * * *